United States Patent Office 3,007,763
Patented Nov. 7, 1961

3,007,763
CROSS-LINKING FIBERS WITH DIISOCYANATES IN DIMETHYLSULFOXIDE
Alden R. Adams, Wilmington, Del., assignor to American Viscose Corporation, Philadelphia, Pa., a corporation of Delaware
No Drawing. Filed Nov. 18, 1955, Ser. No. 547,852
8 Claims. (Cl. 8—116.2)

The present invention is directed to an improved method of bringing a cross-linking agent into contact with a fiber having at least one reactive hydrogen thereon. More particularly, it is directed to a method of contacting such fibers with a diisocyanate in a solvent which is non-reactive with the isocyanate and which will swell the fibers so as to expose the polymer chains therein to the action of the diisocyanate.

It is known that cellulose fibers can be treated with diisocyanates to make them water-repellent and to improve their wet and dry strength, see for example, Hanford et al., U.S. 2,339,913. Presumably, the terminal —N=C=O groups of the diisocyanate react with an active hydrogen on two adjacent polymer chains to effect cross-linking between the two. Where the polymeric chain in the fiber contains hydroxyl linkages, as in regenerated cellulose, the bond between the —OH group and the diisocyanate is probably through a urethane linkage. The bond between chains having amino groups is a urea linkage. The bond between chains having carboxyl groups is eventually an amide linkage. All three types would be present, for example, in the cross-linking of proteins by diisocyanates. These reactions can be illustrated as follows:

(1)  $2ROH + R_1(NCO)_2 \longrightarrow R_1(NHCOOR)_2$ (2) 
$R_1(NCO)_2 + 2RNH_2 \longrightarrow R_1(NH\overset{O}{\overset{\|}{C}}-NHR)_2$ (3)
$R_1(NCO)_2 + 2R-COOH \longrightarrow$
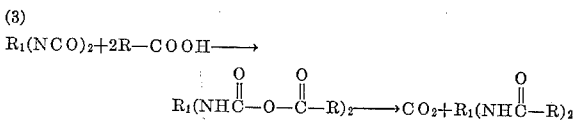
$R_1(NH\overset{O}{\overset{\|}{C}}-O-\overset{O}{\overset{\|}{C}}-R)_2 \longrightarrow CO_2 + R_1(NH\overset{O}{\overset{\|}{C}}-R)_2$ While there are several methods of applying cross-linking agents to textiles, including applying from an emulsion as well as from a vapor state, the simplest and most uniform is from a solution of the diisocyanate. However, the solvent must be non-reactive with the diisocyanates, which automatically excludes any compounds containing hydroxyl, amino, or carboxyl groups as shown by the above reactions. Thus, such common solvents as water, lower alcohols, carboxylic acids, ethanolamine, and so forth, are excluded. This limitation also excludes such common mineral acids as hydrochloric acid which reacts with an isocyanate to form a carbamyl halide, thus: $RNCO + HCl \rightarrow RNHCOCl$. This is unfortunate because some of these solvents, e.g., water, are good swellants for textile fibers, yet cannot be used as such in the presence of the diisocyanate. The prior art, therefore, found it necessary to go to considerable lengths to effect swelling of the fiber without, at the same time, permitting the diisocyanate to react with the swelling agent. The Hanford patent mentioned above illustrates this. Preliminary to treating a cellulosic material, such as rayon, with a diisocyanate cross-linking agent, Hanford preswells the yarn by wetting it with water. This water must then be completely removed from the swollen fiber before the diisocyanate treatment, otherwise the latter would react with the water according to Reaction Number 1 above. Hence, patentee removes the water from the yarn by washing with methanol. But since methanol also reacts with diisocyanates (Reaction 1 above) the methanol must then be removed by immersing the yarn in dry benzene. This completed, the yarn is then contacted with the cross-linking solution of diisocyanate in benzene, making a total of four successive liquid treatments.

It would obviously be much simpler if the swelling agent would not have to be removed from the fiber by solvent interchange prior to diisocyanate treatment. Stated another way, it would be desirable if the swellant were not only inert with respect to the diisocyanate but also a solvent for it, in which case both could be applied as one solution. In addition, it would also be desirable if such a solvent could be used in any amount without altering its swellant action on the fiber, i.e., an excess of solvent should not dissolve the fiber. This latter difficulty is one encountered when a hydroxylated rubber is treated with an isocyanate to improve its gas and oil resistance, as in U.S. 2,417,424; the benzene solvent in which the isocyanate is applied will dissolve the rubber itself if given time.

Accordingly, it is an object of this invention to provide an improved method of treating a fiber with a cross-linking agent without resorting to a series of preswelling treatments. A more specific object is the provision of a new and improved solvent for a fiber cross-linking agent, specifically one which is not only inert to the cross-linking agent but is also a swellant for the fiber. An added object is the provision of a solvent for a diisocyanate which will permit treatment of a reactive hydrogen-containing polymer in the presence of rubber without danger of dissolving the rubber.

These objects are achieved by the present invention wherein fibers containing reactive hydrogens in their polymeric structure are contacted with a diisocyanate dissolved in a dimethylsulfoxide solvent. Dimethylsulfoxide, in addition to being a good solvent for diisocyanates, is chemically inert to diisocyanates in all proportions and an effective swellant for cellulosic fibers. It can be used in any amount without altering the cross-linking action of the diisocyanate on the fabric or its own inertness with respect to the diisocyanate. The use of this solvent eliminates the expensive and troublesome solvent interchange processes described by Hanford as a preliminary to the diisocyanate treatment.

In order to test the effectiveness of dimethylsulfoxide, two sets of comparative runs were made on cellulose fibers under two sets of temperature conditions.

EXAMPLE I

A bundle of rayon fibers was divided into four approximately equal portions, each portion weighing approximately five grams. The four samples were then placed in individually weighed bottles. Two samples were immersed in a 5% and 10% solution, respectively, of m-tolylene diisocyanate in dimethylsulfoxide at room temperature for 24 hours. The third and fourth samples were steeped in dimethylsulfoxide at room temperature for 72 hours, the samples removed from the bottles, excess solution squeezed therefrom, and each sample transferred to an individual 200 cc. flask. One of the samples was then covered with a 5% solution of m-tolylene diisocyanate in dimethylsulfoxide, the other with a 10% solution, and both were then refluxed on a steam bath for 72 hours.

All samples were then washed twice with acetone, air-dried for one hour, oven dried at 75–100° C. for 2½ hours in the weight bottles, and then cooled in a desiccator and re-weighed. The samples were then analyzed for nitrogen content. Any increase in the nitrogen content thus determined could only be attributed to the diisocyanate and such increased nitrogen content could only be in bound form because any unbound diisocyanate would have been removed in the washing step. Hence by determining the increase in the weight of the reacted fiber over the unreacted fiber, and then analyzing the reacted fiber to determine its nitrogen content one can easily compute what the gain in nitrogen was in the reacted fiber. This, then, is an accurate index of the amount of diisocyanate which has become bonded to the fibers in the course of their treatment.

The results of this test are set out in Table I below:

Table I

| Sample [1] | Treating Solution,[2] percent | Weight Before | Weight After | Weight Increase, percent | Percent $N_2$ in Treated Fiber |
|---|---|---|---|---|---|
| 1 (Room Temp.) | 5 | 4.94 | 5.55 | 12.5 | .076 |
| 2 (Room Temp.) | 10 | 5.24 | 5.78 | 10.3 | .074 |
| 3 (Reflux Temp.) | 5 | 4.73 | 9.11 | 92.7 | 3.47 |
| 4 (Reflux Temp.) | 10 | 4.44 | 8.46 | 90.5 | 2.97 |

[1] Samples contained 0.00% $N_2$ originally.
[2] Percent of m-tolylene diisocyanate in dimethylsulfoxide, parts by weight.

It is evident from these figures that a certain amount of cross-linking between the fiber and the diisocyanate is effected by a simple one-step treatment of the fiber by the diisocyanate solution at room temperature. However, the percentage of bound nitrogen in the fiber increases enormously when the fiber is pre-swelled in the dimethylsulfoxide and then treated with the dimethylsulfoxide-diisocyanate solution under reflux rather than at room temperature. It is also evident that a 10% solution is no more effective than a 5% solution, indicating that variations in the strength of the solution have no corresponding effect on the bound nitrogen content. This is a marked contrast to the situation previously mentioned wherein rubber is treated with an isocyanate in a solvent which would dissolve the rubber if used in excessive amounts. No such problem accompanies the use of dimethylsulfoxide since it is not a solvent for rayon.

It should be mentioned at this point that dimethylsulfoxide does not dissolve rubber. This permits the cross-linking action of diisocyanates on rubber, illustrated in U.S. 2,417,424, to be effected in a solvent, dimethylsulfoxide, which is harmless to rubber in all concentrations, unlike benzene, the more conventional solvent for diisocyanates. In short dimethylsulfoxide is an alternative solvent for contacting rubber with chemical treating agents.

Exemplary —N=C=O compounds include polymethylene diisocyanates such as ethylene diisocyanate, trimethylene diisocyanate, dodecamethylene diisocyanate, hexamethylene diisocyanate, tetramethylene diisocyanate, and pentamethylene diisocyanate; alkylene diisocyanates such as propylene-1,2-diisocyanate, butylene-1,2-diisocyanate, and butylene - 1,3 - diisocyanate; alkylidene diisocyanates such as ethylidene diisocyanate ($CH_3CH(NCO)_2$); cycloalkylene diisocyanates such as 1,4 - diisocyanatocyclohexane, and cyclopentylene - 1,3 - diisocyanate; aromatic polyisocyanates such as m - phenylene diisocyanate, p-phenylene diisocyanate, 1 - methyl - phenylene-2,4-diisocyanate, naphthylene-1,4-diisocyanate, o-o'-toluene diisocyanate, diphenyl-4,4'-diisocyanate, benzene-1,2,4 triisocyanate, 5-nitro-1,3-phenylene diisocyanate, xylene-1,4 diisocyanate, xylylene-1,3 diisocyanate, 4,4' - diphenylenemethane diisocyanate, and 4,4'-diphenylenepropane diisocyanate; aliphatic-aromatic diisocyanates such as phenylethylene diisocyanates ($C_5H_6CH(NCO)CH_2NCO$); 1,2,-3,4-tetraisocyanatobutane, butane-1,2,2 triisocyanate, and 2-chloro-1,3-diisocyanatopropane.

Diisocyanates of 2–12 carbon atoms are preferred because they are more soluble in dimethylsulfoxide than are the higher homologues and are also more reactive. In addition they are more readily obtainable on the market.

Illustrative examples of hydrogen-donor textile materials, more particularly organic hydrogen-donor textile materials (in thread, yarn, twisted yarn, fabric or other form) which may be treated with the above-described diisocyanate materials to impart improved properties thereto are polysaccharide-containing textiles, for instance those formed of or containing cellulose or regenerated cellulose, e.g., cotton, linen, hemp, jute, ramie, sisal, partial esters of cellulose (fully esterified cellulose such as cellulose triacetate is excluded because it has no free hydrogens) such as cellulose mono- or diacetate rayons, cellulose acetate-butyrate rayons, saponified acetate rayons, viscose rayons, cuprammonium rayons, ethyl cellulose, etc.; mixtures of such polysaccharide-containing textiles; protein-containing textiles, for instance those formed of or containing wool, silk, hairs and twisted hairs of various kinds including mohair, leather, fur, regenerated protein fibers or fabrics, e.g., those produced from casein, soyabean, peanut, corn (zein), egg albumin, feathers (keratin, collagen, etc.); mixtures of such protein-containing textiles; mixtures of polysaccharide-containing and protein-containing textiles such as those mentioned above by way of illustration; textiles formed of or containing synthetic resins having —OH groups in the molecule, e.g., alkyd resins containing —OH groups, polyvinylalcohol and partially esterified and etherified polyvinyl alcohols, etc.; synthetic silk, e.g., nylon, synthetic polypeptides, etc.; mixtures of nylon or other synthetic silk with a rayon or with other materials such as aforementioned; and mixtures of synthetic resins containing —OH groups with nylon, polypeptides, rayons or with any of the other materials named above. The polymeric or copolymeric isocyanates also may be utilized as twist-setting agents in the manufacture of textiles such, for example, as novelty fabrics. Furthermore, they may be used in treating textiles containing absorbed or combined water or having a thin film of water adsorbed on its surface, e.g., glass, asbestos, etc., in filament, fiber, fabric, felted or other form and having water therein or thereon. The water reacts with the isocyanate polymer or copolymer and insolubilizes the latter in situ.

The above specification and examples are to be considered as illustrative of the invention; hence any modifications or variations thereof directed to the same general purpose are not ruled out. For example, while these two sets of conditions illustrated were at room temperature and reflux, the reaction can also be effected at intermediate temperatures. Nor is the reaction time critical; while the shortest treating time illustrated in the example was 24 hours, this time can be reduced at higher temperatures according to the general rules of reaction rates and chemical kinetics. Even at shorter times a certain amount of cross-linking is effected.

As regards the concentration, one may employ more dilute solutions of diisocyanate than the 5% and 10% illustrated, as well as more concentrated solutions to attain the desired degree of cross-linking.

I claim:

1. A process for improving the wet strength of regenerated cellulose fiber which comprises contacting said fiber with a dimethyl sulfoxide solution of an organic diisocyanate cross-linking agent for cellulose having from 2 to 12 carbon atoms for a time sufficient to permit cross-linking of the polymer chains in said fiber, removing excess treating solution from said fiber, and drying.

2. The process of claim 1 wherein the diisocyanate is m-tolylene diisocyanate.

3. The process of claim 1 wherein the concentration of the diisocyanate in solution ranges from about 5 to about 10%.

4. The process of claim 1 wherein the fiber is contacted with the solution at a temperature ranging from about room temperature to reflux temperature of the solution for about 24 to about 72 hours.

5. A process for improving the wet strength of regenerated cellulose fiber which comprises first swelling said fibers by steeping in dimethyl sulfoxide, then contacting said fibers with a dimethyl sulfoxide solution of an organic diisocyanate cross-linking agent for cellulose having from 2 to 12 carbon atoms for a time sufficient to permit cross-linking of the polymer chains in said fiber, removing excess treating solution from said fiber, and drying.

6. The process of claim 5 wherein the diisocyanate is m-tolylene diisocyanate.

7. The process of claim 5 wherein the concentration of diisocyanate in solution ranges from about 5 to about 10%.

8. The process of claim 5 wherein the cellulose fiber is contacted with the diisocyanate solution at a temperature ranging from about room temperature to reflux temperature of the solution for about 24 to about 72 hours.

References Cited in the file of this patent

UNITED STATES PATENTS

| | | |
|---|---|---|
| 2,333,914 | Berchet | Nov. 9, 1943 |
| 2,339,913 | Hanford | Jan. 25, 1944 |
| 2,417,424 | Latham | Mar. 18, 1947 |
| 2,806,829 | Capps | Sept. 17, 1957 |

FOREIGN PATENTS

| | | |
|---|---|---|
| 571,975 | Great Britain | Sept. 18, 1945 |
| 586,549 | Great Britain | Mar. 24, 1947 |

OTHER REFERENCES

Vickerstaff, Thomas: The Physical Chemistry of Dyeing, Intersci. Pub., Inc., N.Y.C., 1954, pp. 489–492

Houtz: Textile Research, November 1950, pp 786–793, 800 and 801.